(No Model.)
B. J. MILES & J. J. JENKINS.
WHEEL ATTACHING DEVICE.
No. 360,714. Patented Apr. 5, 1887.
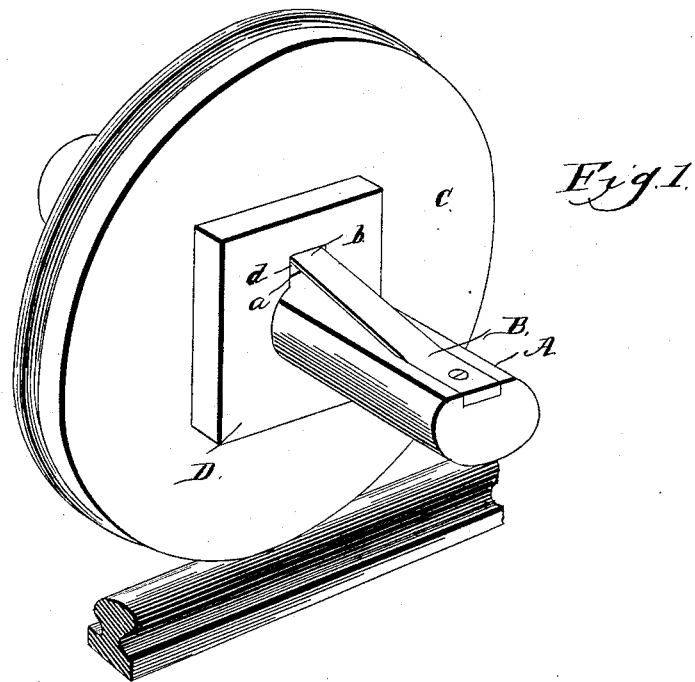
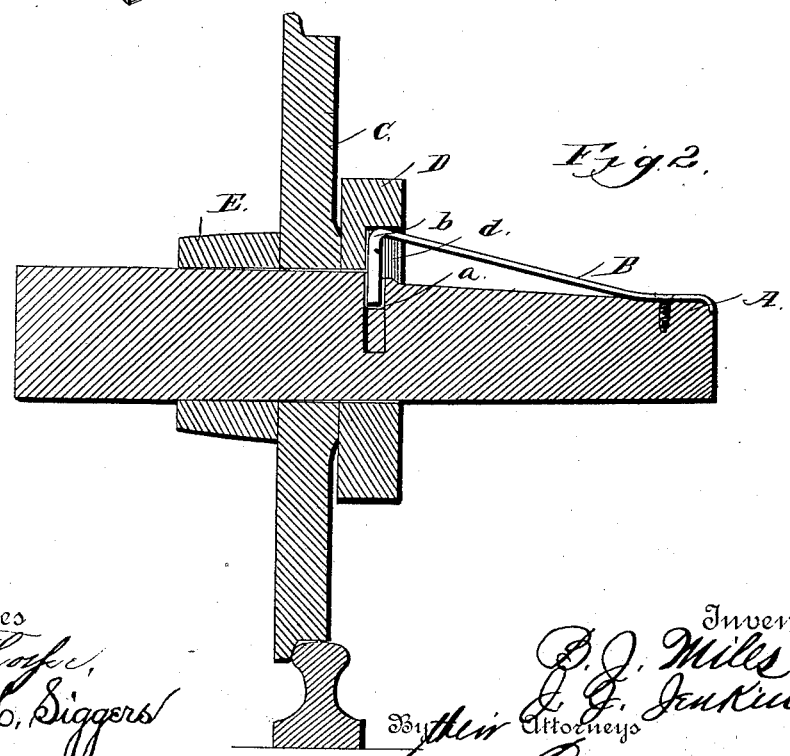

UNITED STATES PATENT OFFICE.

BENJAMIN J. MILES AND JINKEN J. JENKINS, OF GIRARD, OHIO.

WHEEL-ATTACHING DEVICE.

SPECIFICATION forming part of Letters Patent No. 360,714, dated April 5, 1887.

Application filed February 10, 1887. Serial No. 227,182. (No model.)

*To all whom it may concern:*

Be it known that we, BENJAMIN J. MILES and JINKEN J. JENKINS, citizens of the United States, residing at Girard, in the county of Trumbull and State of Ohio, have invented a new and useful Improvement in Wheels, of which the following is a specification.

This invention relates to improvements in wheels, referring more particularly to the mode of securing the former on the axles; and its main object is to dispense with the use of a linchpin, which is likely to break or bend, in the former case allowing the wheel to come off the axle and in the latter causing it to wabble or have uneven motion thereon.

The invention consists in retaining the wheel in place by means of a spring and recessed block, as hereinafter described, illustrated in the drawings, and pointed out in the claims hereto appended.

In the accompanying drawings, forming part of this specification, Figure 1 represents a perspective view of our invention. Fig. 2 is a central vertical sectional view passing through the recess in the block and the spring-recess in the axle.

The invention is applicable to any class of vehicles, but in the present instance is shown applied to a railway-car.

Referring to the drawings by letter, A designates the outer part of an axle of a car, flattened near its end, and having secured at its end, upon said flattened portion, the outer end of a spring-plate, B. The inner end of said spring is bent so as to form the shoulder *b*, and inward from said shoulder enters a radial recess, *a*, in the axle. The free end of the spring, or the part that enters the recess *a*, is made much thicker than the part to the outer side of the shoulder, for the reason that the former has to receive the whole power of the outward thrust of the wheel.

C is a car-wheel of ordinary construction, the central opening of which is intended to slip over the end of the axle, and, depressing the spring B, to pass to the inner side thereof. The axle, at the part where the wheel attains after passing the spring, increases gradually in diameter as it runs inward, so that the wheel tends to bind thereon.

D is a retaining-block, preferably rectangular in contour, and having a central circular opening through it, to pass over the end of the axle and over the spring in a similar manner to the wheel. On the outer face of said block is the recess *d*, formed in the line of the diameter of the central opening, and into which the shoulder *b* enters when the parts are in place, the block resting against the outer surface of the wheel, holding the latter in place and steadying it. The block has in its upper edge the orifice of an oil-channel, through which to grease the bearing when necessary.

It is evident that the spring and block can be attached to an axle very nearly as cheaply and quickly as a linchpin can be so attached, and that it is not liable to break, so as to allow the wheel to fail off, nor to bend, causing the wheel to rotate with a lateral motion or wabble. The block, moreover, by its extent tends to hold the wheel vertical at all times.

By pressing the spring firmly inward the wheel and retaining-block can be readily and quickly released.

E is a collar on the axle, to the inner side and bearing against the inner face of the wheel.

Having described our invention, we claim—

1. The combination, with the axle having a flat upper side, of the spring-plate having one end secured to the end of the axle on the flat side thereof, and a retaining-block fitted on the axle outside the wheel, having a recess in its side to receive the free end of the spring-plate, substantially as specified.

2. The combination, with the axle having a flat upper side and provided with a radial recess, of a retaining-block fitted on the axle outside the wheel, and having a recess in its outer face in alignment with the radial recess in the axle, and a spring-plate having one end secured to the axle and its other end bent downward to engage the recess in the retaining-block and enter the radial recess in the axle, substantially as specified.

In testimony that we claim the foregoing as our own we have hereto affixed our signatures in presence of two witnesses.

BENJAMIN J. MILES.
    JINKEN J. JENKINS.

Witnesses:
 WM. D. READ,
 C. D. GOODRICH.